(12) United States Patent  (10) Patent No.: US 7,702,444 B2
Schiele                    (45) Date of Patent:    Apr. 20, 2010

(54) PROCESS FOR OPERATING A VEHICLE POWER TRAIN DURING AN ACTIVATED ENGINE START/STOP FUNCTION

(75) Inventor: Peter Schiele, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 402 days.

(21) Appl. No.: 11/830,233

(22) Filed: Jul. 30, 2007

(65) Prior Publication Data

US 2008/0029331 A1    Feb. 7, 2008

(30) Foreign Application Priority Data

Aug. 5, 2006    (DE) ........................ 10 2006 036 755

(51) Int. Cl.
    *G06F 7/00* (2006.01)
(52) U.S. Cl. .............................. 701/53; 701/51; 701/54; 701/87; 477/7; 477/34; 180/338
(58) Field of Classification Search .................. 701/51, 701/52, 53, 54, 87; 477/2, 7, 34, 37, 62; 180/338, 65.25
See application file for complete search history.

(56) References Cited

U.S. PATENT DOCUMENTS 5,846,155 A * 12/1998 Taniguchi et al. ............. 477/2
6,099,435 A * 8/2000 Halene et al. ................ 477/62
6,668,978 B2   12/2003 Fessler et al.
6,808,470 B2   10/2004 Boll
2005/0155803 A1  7/2005 Schiele

FOREIGN PATENT DOCUMENTS

| DE | 100 44 177 C1 | 1/2002 |
| DE | 101 58 536 A1 | 7/2003 |
| DE | 102 26 143 A1 | 1/2004 |
| DE | 10 2004 002 061 A1 | 8/2005 |
| DE | 10 2004 016 846 A1 | 10/2005 |

\* cited by examiner

*Primary Examiner*—Gertrude Arthur Jeanglaud
(74) *Attorney, Agent, or Firm*—Davis & Bujold, P.L.L.C.

(57) ABSTRACT

A process for operating a power train of a vehicle, during an activated internal combustion engine (2) start/stop function. The power train includes the engine (2), which is started with torque from a starter (3), an output (5), and a non-positive shifting element (6A), having a continuously variable transmission, and a starting device (6) arranged between the engine (2) and the output (5). A portion of the torque from the engine (2) and/or the starter (3), depending on a set shifting element (6A) transmission capacity, is directed by starting device (6) toward the output (5). When there is a demand for starting the engine (2), the shifting element (6A) transmission capacity is adjusted to an amount at which at least a portion of the torque, generated by the starter (3), exceeding the needed torque to start the engine (2) during the startup procedure, is directed to the output (5).

20 Claims, 2 Drawing Sheets

PROCESS FOR OPERATING A VEHICLE POWER TRAIN DURING AN ACTIVATED ENGINE START/STOP FUNCTION

This application claims priority from German Application Serial No. 10 2006 036 755.3 filed Aug. 5, 2006.

FIELD OF THE INVENTION

The invention concerns a process for operating a power train of a vehicle during an activated engine start/stop function for an internal combustion engine.

BACKGROUND OF THE INVENTION

Different vehicle concepts, where the internal combustion engine of the vehicles can be shut down during suitable operating states, available for the purpose of reducing the consumption and noxious substance emissions of the vehicles are known from the practice. They are configured with conventional internal combustion engines, such as gasoline-powered or diesel-powered internal combustion engines. These functions are called engine start/stop functions and are activated or de-activated, depending upon the operating states of the various vehicle components. They shut down an internal combustion engine even during short vehicle standstills when they are activated and start it up again when there is a demand for a startup of the internal combustion engine.

In order to prevent affecting the driving operation with an engine start/stop function, a short startup process of the internal combustion engine and an immediate build up of power transmission in a transmission of the vehicle take place when the driver of the vehicle demands to continue driving, especially when driving into high traffic and streets with the right of way. In conventionally designed automatic transmissions or automated manual transmissions, which are configured with wet-running disk clutches, the clutches are supplied with the required startup pressure via a transmission pump essentially only when the internal combustion engine is running. The buildup of power transmission must first overcome a slack of the clutches to be activated and the clutches to be activated are, in addition, to be completely engaged by raising the startup pressure, according to predetermined activation guidelines, Compensation for the slack of a clutch, as well as its activation in the power flow of a transmission, is achieved by directing a specific hydraulic fluid volume to flow into a piston chamber of the hydraulically controllable and activatable clutch, which can be accomplished by the transmission pump driven by the started internal combustion engine.

If several shifting elements or a transmission mechanism are disengaged before the vehicle is driven again, due to the fact that the engine is shut down and are then engaged to again drive the vehicle, the time, between the start of the startup procedure of the internal combustion engine and the point in time at which the powerflow has been completely reestablished in the transmission, is extended under certain circumstances to such an extent that a vehicle is provided with an engine start/stop function cannot be operated within the sought range of time.

In order to still be able to operate vehicles having conventional transmission mechanisms with an implemented engine start/stop function in the desired manner, aside from the main transmission pump of the known vehicles, a further hydraulic pump operated by way of an electric motor, is also provided, whose delivery volume is independent from the rotational speed of the internal combustion engine and which at least generates a pressure in the hydraulic system when there is no pressure supply, via the main transmission pump of the transmission mechanism, which generally compensates for the slack of the clutches, activated in the transmission in order to produce the power flow in the transmission.

The tests have shown that a driver of a vehicle is particularly aware of the time period between a point of releasing a brake pedal and the point in time at which an input torque builds up in the output of the vehicle, for which reason the customer acceptance of these start/stop systems, during the startup procedure of the internal combustion engine, depends essentially on the amount of reaction time the power train takes to establish an amount of output torque, necessary for vehicle acceleration, at the output. An operating state characteristic, that is critical with regard to the evaluation on the driver side of the spontaneity of an engine start/stop system, is present upon a full-load startup with simultaneous actuation of the brake pedal following the previous engine stop. During an operating state characteristic such as this, the period, starting with the actuation of the accelerator pedal by the driver up to torque buildup at the output, is experienced as particularly bothersome for the driver.

In power trains, having a combination of an automatic transmission and a startup system with a hydrodynamic torque converter or a non-positive startup clutch, the flow of power within the transmission, during the shutdown phases of the internal combustion engine, is generally ensured, via a previously described supplementary pump, or the power flow is interrupted in the area of the automatic transmission when a selector lever is in the neutral or park position. In the last mentioned operating state of the automatic transmission, the shifting elements of the automatic transmission, which are configured as shifting clutches or shifting brakes and can be hydraulically controlled, are shifted without pressure and are in an essentially disengaged state.

If a demand is made for starting the internal combustion engine output torque, at the output of the vehicle, occurs only when the rotational speed of the internal combustion engine has reached a defined value, at which torque is forwarded in the direction of the transmission input of the automatic transmission connected downstream of the converter, because of a characteristic converter identification of a torque converter of a starter unit of a power train.

In one embodiment of a power train with an automatic transmission and a starter unit with a startup clutch, a hydraulically controllable startup clutch is engaged without pressure without a hydraulic supplementary pump when the engine is shut down. This results from the fact that the main transmission pump is usually driven by the internal combustion engine and for this reason a corresponding startup pressure is only made available to the startup clutch when the internal combustion engine reaches a corresponding rotational speed. The main transmission pump has merely a limited delivery rate during the startup phase of the internal combustion engine, during which the latter has low rotational speeds. For this reason, the time period between the point in time, starting at which the driver can expect a torque at the output exceeds the time point starting where the startup clutch has an available transfer capacity with a desired limit value where a torque can be fed in the direction of the output, via the startup clutch.

It is, therefore, an object of the invention to make a process for operating a power train of a vehicle available during an activated engine start/stop function for an internal combustion engine, where the spontaneity of vehicles, designed with engine start/stop functions, can be easily and economically improved.

SUMMARY OF THE INVENTION

In the process, according to the invention, for operating a power train of a vehicle during an activated engine start/stop function for an internal combustion engine with a starter unit for the internal combustion engine, where at least drive torque for starting the internal combustion engine can be generated, with an output and with a non-positive shifting element configured with a continuously variable transmission capacity and with the starter unit arranged, between the internal combustion engine and the output, where a portion of the input torque of the internal combustion engine and/or the input torque of the starter unit can be directed toward the output, via the starter unit, depending upon the currently set transmission capacity of the shifting element, the transmission capacity of the non-positive shifting element is set to a value where at least part of the portion of the input torque, generated by the starter unit that exceeds the startup input torque of the internal combustion engine, via the shifting element, during the startup procedure of the internal combustion engine on the side of the starter unit, is applied as output torque at the output.

The invention makes use of the fact that starter units for internal combustion engines of power trains controlled by engine start/stop functions for starting internal combustion engines within unfavorable operating ranges, that is, with low operating temperatures of the internal combustion engine, are designed for the purpose of being able to securely start the internal combustion engine at any time. This means that starter units provides input torque, that exceeds a startup input torque required for starting an internal combustion engine within many operating ranges of the internal combustion engine. A portion of the input torque of a starter unit that exceeds the startup input torque of an internal combustion engine is essentially independent of the rotational speed of the internal combustion engine at the start of the startup procedure of an internal combustion engine and is forwarded, at least in part, by way of the correspondingly adjusted transmission capacity of the non-positive shifting element to the starter unit of the power train in the direction of the output of the power train.

The mode of operation is provided for the purpose of forwarding the portion of the input torque that exceeds the startup input torque of the internal combustion engine or the excess torque of the startup system for fast buildup of torque at the output already at the start of the startup procedure of the internal combustion engine in the direction of the output. It is assumed that a transmission mechanism, possibly connected downstream in the startup direction, can direct the torque forwarded, via the starter unit or via its non-positive shifting element, in the direction of the output during the startup phase of the internal combustion engine also in the direction of the output.

In addition, driving comfort of the internal combustion engine is also achieved by way of the process due to uniform tractional force buildup in the power train during the startup procedure. This advantage is of particular importance when the power train has a hydrodynamic torque converter, since torque that is directed, via a hydrodynamic torque converter, increases as a square of the rotational speed, which can lead to a high or impulsive power train torque load, especially during short startup times of the internal combustion engine and an accompanying steep increase of the input torque of the internal combustion engine, which can be perceived as an uncomfortable jolt by a driver. A jolt such as this is produced when backlashes and elasticities in the power train are overcome abruptly.

In the embodiment of a power train with a hydrodynamic torque converter, the buildup of creeping torque at the output, during the startup procedure of an internal combustion engine, is realized by adjusting the converter bridging clutch, allocated to the torque converter in an automatic torque converter transmission, which represents a non-positive shifting element of a starter unit, to a defined transmission torque, via a hydraulic control, a purely mechanical control, preferably via an initial spring load of the friction elements of the converter bridging clutch or by combining a hydraulic and a mechanic control, which also applies similarly for power trains with starter units that have non-positive startup clutches.

If a power train is operated according to the process of the invention, a defined torque, generated by the starter unit, is introduced into the power train, via the starter unit, in the direction of the output before or during the startup procedure of the internal combustion engine. Backlashes and elasticities of the power train are already overcome at the time points at which the internal combustion engine still does not supply an input torque.

In addition, by using the process of the invention, the time period between the initiation of the startup procedure of the internal combustion engine, at which the torque of the internal combustion engine starts to increase due to the input on the side of the starter unit, and the point in time at which torque builds up at the output, is shortened to such an extent, that in comparison with the conventionally operated power trains, a power train operated can be operated at least predominantly with the desired spontaneity when the engine start/stop function is activated.

In an advantageous variation of the process, the maximum input torque that can be generated by the starter unit, as well as the torque required for starting the internal combustion engine, is determined, based on the operating state parameters of the power train, while the difference of the determined torque corresponds to the amount of torque that can be fed, via the non-positive shifting element of the starter unit, in the direction of the output without affecting the startup procedure of the internal combustion engine. In this way, the maximum torque that can be applied at the output in all the operating states of a power train, during a startup procedure of an internal combustion engine, is known.

In a further advantageous variation of the process, the portion of the input torque of the starter unit that exceeds the startup input torque is determined, based on the gradient of the characteristic of the torque of the internal combustion engine. The possibility of increasing the value of the torque that can be supplied, via the non-positive shifting element of the starter unit, is provided in a simple way by increasing the transmission capacity with a corresponding torque characteristic, with a corresponding increase of the input torque of the starter unit or with a through-start of the internal combustion engine in order to make the desired spontaneity of the vehicle available. The portion of the input torque, generated by the starter device that exceeds the startup input torque of the internal combustion engine, is determined from the rotational speed curve of the internal combustion engine and the transmission capacity of the non-positive shifting element of the starter unit is adjusted, depending upon the actual operating state characteristic of the power train, in order to retain the spontaneity of the vehicle.

If the starter unit is an electric machine with an allocated storage of electricity, the transmission capacity of the non-positive shifting element of the starter unit is adjusted, depending upon a charge state of the electric storage, in an advantageous variation of the process. In this way, it is easy to prevent the engine start/stop function or a startup procedure from being carried out, via the engine start/stop function of the internal combustion engine, by excessively diverting the rotational speed within the range of the non-positive shifting element of the starter unit in the direction of the output. The amount of charge of the storage can be metrologically determined, for example, via corresponding sensors.

A further advantageous variation of the process is characterized in that the transmission capacity of the non-positive shifting element of the starter unit is varied depending upon actuation, by the driver, of a brake pedal and/or a power demand element or an accelerator pedal, via which a driver of a vehicle delivers a power demand. In this variation, a situation where traffic safety is critical can be easily deduced from the behavior of the driver or an evaluation of a driver type can be carried out and spontaneity can be made available for the vehicle, which is adapted to the behavior of the driver according to the existing operating parameters of the power train.

If a further shifting element with continuously variable transmission capacity is arranged between the starter unit and the output, its transmission capacity can be adjusted in an advantageous variation of the process when a demand for starting the internal combustion engine is present and can be set to a value at which a defined torque can be directed to the output, via the further shifting element, when the engine start/stop function is activated, while the further shifting element is switched to a slip operation when a torque that exceeds the defined torque is applied.

The mode of operation is particularly advantageous, especially when the starter unit has a hydrodynamic torque converter and a converter bridging clutch, since the transmission capacity of the non-positive shifting element of the starter unit, configured as a converter bridging clutch, is adjusted, depending upon the converter identification of the torque converter, when the input rotational speed of the internal combustion engine increases. Torque, supplied in the direction of the output, can be easily limited within the range of the further shifting element. Also when torque, which is not required or desired for the currently required spontaneity at the output, is passed in the direction of the further shifting element, via the starter unit, configured with a hydrodynamic torque converter starting at a specific input rotational speed of the internal combustion engine.

Control and management complexity within the range of the starter unit, configured with a converter bridging clutch and a hydrodynamic torque converter is reduced, since the transmission capacity of the converter bridging clutch can be set at the start of the startup procedure, at which it has essentially no influence on the torque that is passed in the direction of the output, without taking into consideration the converter identification. The influence of the converter identification increases when there is an increase of the input rotational speeds of the internal combustion engine, whereby the torque increase, at the torque converter side, is initiated in the area of the starter unit and the transmission capacity of the converter bridging clutch would have to be accordingly varied.

This is not required with the previously described control of the further shifting element, since the transmission capacity of the further shifting element merely makes it possible to forward the predefined torque value. The mode of operation offers, in a simple and economic way, the possibility of attenuating or eliminating any torque increases in the power train in the area of the further shifting element and thus increasing the driving comfort.

In addition, the previously described mode of operation, during a startup procedure of an internal combustion engine, represents a security factor, where a startup security of an internal combustion engine is also easily improved in the operating states of a power train during which the transmission capacity of the non-positive shifting element of the starter unit does not correspond to the value to be currently set, due to the control and/or management deviations or production tolerances, and the torque value directed, via the non-positive shifting element of the starter unit, in the direction of the further shifting element corresponds to a value that would lower the input torque, made available to the starter unit for the startup procedure of the internal combustion engine, to a level at which the startup procedure of the internal combustion engine cannot be carried out as desired.

BRIEF DESCRIPTION OF THE DRAWINGS

The invention will now be described, by way of example, with reference to the accompanying drawings. The components, identical in design and function, are provided with the same reference numerals in the description of the different exemplary embodiments for reasons of clarity. In the drawings.

DETAILED DESCRIPTION OF THE INVENTION

Figure 1:
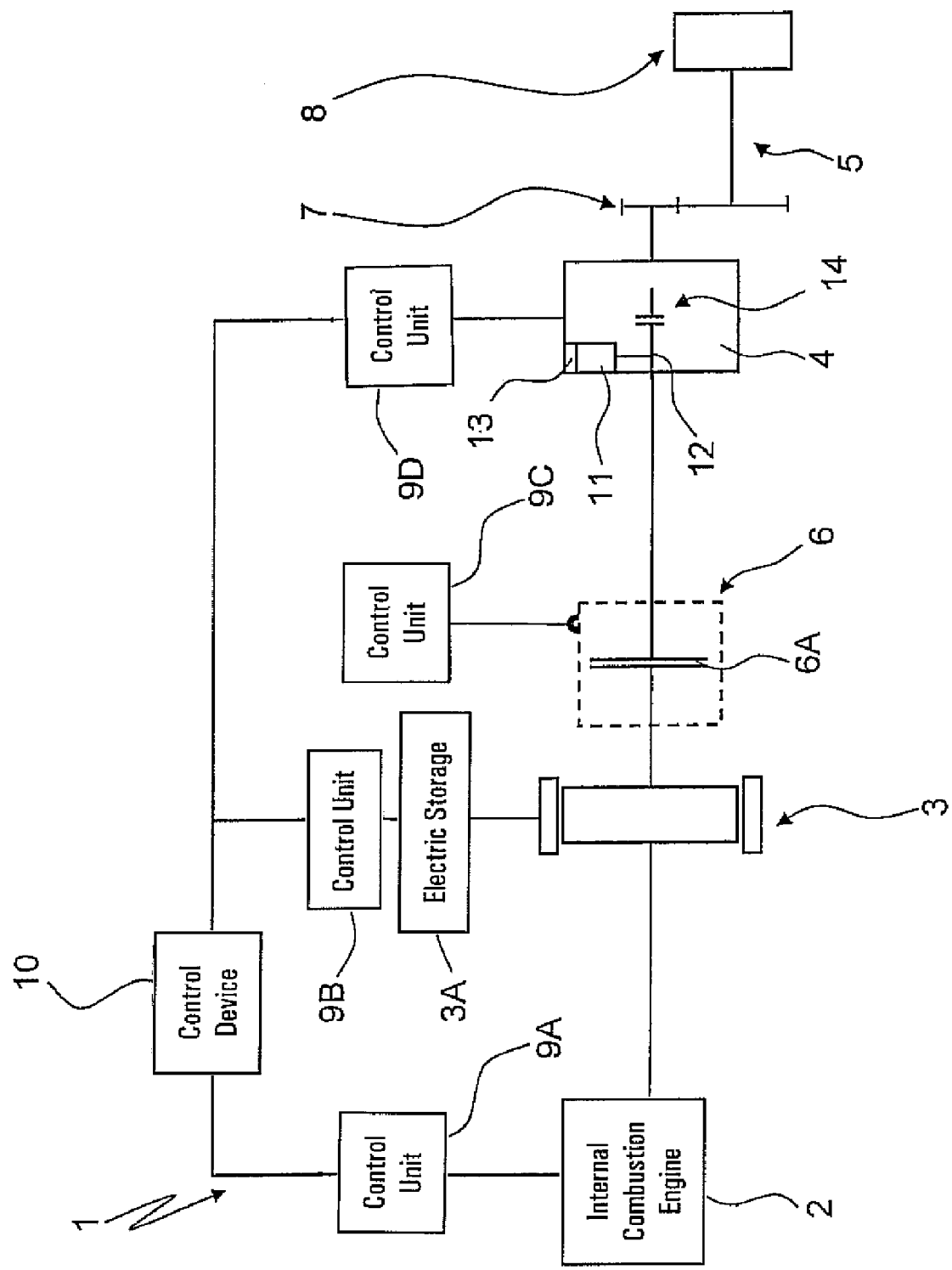
FIG. 1 shows a highly schematized representation of a first exemplary embodiment of a power train of a vehicle.

FIG. 1 shows a highly schematized representation of a power train 1 of a vehicle in the form of a block circuit diagram. The power train 1 comprises an internal combustion engine 2, a starter unit 3 for the internal combustion engine 2, a transmission mechanism 4 and an output 5. Located between the starter unit 3 and the transmission mechanism 4 is a starter unit 6, which has a non-positive shifting element 6A or a startup clutch with a continuously variable transmission capacity.

The starter unit 6 is located, between the internal combustion engine 2 and the output 5, in order to be able to start a vehicle provided with the power train 1, via the internal combustion engine 2 in a known manner, wherein the non-positive shifting element 6A of the starter unit 6 is first operated with slip, during the startup procedure starting from standstill, in order to be able to compensate for the rotational speed difference between the stationary output 5 and the minimum rotational speed of the internal combustion engine 2, without stalling the internal combustion engine.

The transmission mechanism 4 is configured herein as a conventional automatic transmission, via which different gear ratios can be made available. The transmission mechanism 4 can be any of the transmissions known from the practice, in which the starter unit 6, for example, is integrated.

On the side of the transmission mechanism 4 facing away from the starter unit 6 or on the side of the transmission output, the transmission mechanism 4 is positively connected, via an axle differential 7, to wheels 8 of a vehicle driving axle of the power train 1.

Control units 9A, 9B, 9C and 9D are respectively dedicated to the internal combustion engine 2, the starter unit 3, the transmission mechanism 4, and the starting device 6, which are mutually positively connected, via a superordinated control device 10. As an alternative to this, it is also possible to control the internal combustion engine 2, the starter unit 3, the transmission mechanism 4, and the starting device 6 in a corresponding way, via a mutual control unit.

In the first exemplary embodiment of the power train 1 shown in FIG. 1, a so-called engine start/stop function is integrated in the control device 10. The engine start/stop function is activated with specific operating state parameters of the components of the power train 1, causing the internal combustion engine 2 to shut down in predefined operating states in order to reduce the fuel consumption as well as to reduce the noxious substances emission, and then be restarted, via the starter unit 3, when different startup criteria are fulfilled. Aside from the startup function, with activated engine start/stop function, the internal combustion engine 2 is also transferred from a shutdown state into a running state, by way of the starter unit 3, upon a demand from the driver when the engine start/stop function is deactivated.

The starter unit 3 generates, basically, an input torque, which corresponds at least to a startup input torque required for starting the internal combustion engine 2. A higher startup input torque is required for starting the internal combustion engine 2 when the internal combustion engine 2 is started at low operating temperatures, such as with a renewed startup after a long standstill of the vehicle in the winter, than when a normal operating temperature of the internal combustion engine 2 as well as also of other components of the power train 1 is reached.

This means that the starter unit 3 is overdimensioned with regard to its input power for starting the internal combustion engine 2 when the engine start/stop function is activated, in comparison with a so-called cold start of the internal combustion engine 2 and exceeds therefore, depending on the situation, the input power required for starting the internal combustion engine 2 generated by the starter unit 3 in dependence upon the current operating state of the power train 1.

The starter unit 3 is herein an electric machine configured with an allocated electric storage 3A, so that the input torque generated by the electric machine 3 is also dependent on the charge of the electric storage 3A, wherein the control unit 9B, allocated to the starter unit 3, is in positive connection, via the electric storage 3A, with the electric machine of the starter unit 3.

The non-positive shifting element 6A of the starting device 6 is usually entirely disengaged during a startup procedure of the internal combustion engine 2, so that the input torque of the starter unit 3 is available, in its entirety, for a startup procedure of the internal combustion 2 on the side of the starter unit.

During such an operating state of the non-positive shifting element 6A, no torque is forwarded in the direction of the output 5 during the startup procedure of the internal combustion engine 2, via the non-positive shifting element 6A. This is also not expected by a driver of a vehicle equipped with the previously described power train 1 during a first startup of the vehicle or a startup of the internal combustion engine after a long standstill of the vehicle. In contrast to this, a driver expects during normal driving operation, especially while driving through city traffic, that the vehicle will shut down the internal combustion engine 2 in order to reduce consumption, when the engine start/stop function is activated during a standstill of the vehicle and will restart the engine, for example, for continued driving. The driver desires a specific spontaneity of the propulsion system or the power train 1 of the vehicle with regard to the buildup of the torque applied at the output, which is made available by way of the process, which will be described in the following.

When the engine start/stop function of the internal combustion engine 2 is activated, the internal combustion engine 2 is shut down in predefined operating states of the power train 1, that is, for example, near a standstill of the vehicle. When a demand is made for starting the internal combustion engine 2, the starter unit 3 is accordingly operated and provides the startup input torque required for starting the internal combustion engine 2. In order to increase the spontaneity of the vehicle designed with the power train 1, the transmission capacity of the non-positive shifting element 6A is increased to a value at which at least one part of the torque excess of the input torque of the starter unit 3 can be passed in the direction of the output 5, via the non-positive shifting element 6A of the starter unit 6 in comparison with the startup input torque required for the internal combustion engine 2.

The amount of torque that can be passed, via the shifting element 6A, corresponds therein preferably to an output torque that is at least approximately to be expected by a driver, for providing available the desired spontaneity at the output 5 of the vehicle or the power train 1 for a current operating state curve as well as preferably in dependence upon a current behavior of the driver.

The non-positive shifting element 6A of the starting device 6 is controlled herein, via a hydraulic control system designed in the usual manner, wherein the transmission capacity of the shifting element 6A is varied, depending upon the hydraulic control pressure to be respectively applied. In addition, the power flow in the transmission mechanism is herein likewise produced, via hydraulically controllable shifting elements, such as shifting clutches and/or shifting brakes, in order to forward torque that is applied to the transmission input of the transmission mechanism 4 in the direction of the output 5. This means that in order to provide the required spontaneity of the vehicle, designed with the power train 1, the non-positive shifting element 6A as well as the shifting elements of the transmission mechanism 4, should be operated on with a corresponding control pressure.

The hydraulic control pressure is herein provided, via a main transmission pump 11 of the transmission mechanism 4, which is driven, via a transmission shaft 12 that can be driven by the internal combustion engine 2, with a corresponding input torque of the internal combustion engine 2 and thus has a delivery rate that is dependent on the rotational speed of the internal combustion engine 2. When the internal combustion engine 2 is shut down, the main transmission pump 11 does not initially provide any delivery rate. In order to be able to make available the transmission capacity of the non-positive shifting element 6A of the starting device 6 as well as the power flow in the transmission mechanism 4 by way of a corresponding control of the shifting elements of the transmission mechanism 4 in the manner that was described also when the internal combustion engine 2 is shut down, the main transmission pump can be driven, via an allocated electric motor 13, and makes available therewith the required control pressure from the start of a startup procedure of the internal combustion engine 2 on the side of the starter unit for the shifting element 6A of the starting device 6 as well as for the shifting elements of the transmission mechanism 4.

So that the electric motor 13 drives only the main transmission pump 11, via the main transmission pump 11 is connected to the transmission shaft 12, via a freewheel (not described in detail) so that the positive connection between the main transmission pump 11 and the transmission shaft 12 is disengaged when the input rotational speeds of the electric machine 13 are greater than the input rotational speed of the transmission shaft 12.

As an alternative to this, the hydraulic control pressure, required for adjusting the transmission capacity 6A as well as the shifting elements of the transmission mechanism 4, can also be made available, via an electrically drivable supplementary pump, which acts on or supplies the participating hydraulic consumers of the power train 1 to provide torque at the output 5 during a startup procedure of the internal combustion engine 2 with the control pressure required for this purpose.

The transmission capacity of the non-positive shifting element 6A of the starting device 6 of the power train 1 according to FIG. 1 is adjusted depending upon a torque difference between the maximum input torque, that can be generated in the current operating state of the power train 1 by the starter unit 3, and the startup input torque, required for starting the internal combustion engine 2, which are determined based on the operating state parameters of the power train 1. The difference of the determined torques corresponds therein to the maximum torque value that can be directed, via the non-positive shifting element 6A of the starting device 6, in the direction of the output 5 without affecting the startup procedure of the internal combustion engine 2.

The portion of the input torque of the starter unit 3 that exceeds the successful startup input torque of the internal combustion engine 2 is preferably determined therein based on the gradient of the characteristic of the rotational speed of the internal combustion engine 2.

During the startup procedure of the internal combustion engine 2 on the side of the starter unit, the transmission capacity of the non-positive shifting element 6A of the starting device 6 is varied, if required, depending on the rotational speed of the internal combustion engine, to modify the torque applied at the output, depending on the operating state, and to provide the vehicle designed with the power train 1 according to FIG. 1, the spontaneity expected by the driver.

In addition, the transmission capacity of the non-positive shifting element 6A of the starting device 6 is varied, if required, also depending on actuation of the brake pedal by the driver and/or a power demand element, via which a driver of a vehicle supplies a power demand. In this way, the power train 1 can be prepared accordingly, depending upon an actuation speed of the brake pedal or the accelerator pedal for the eventual subsequent startup procedure of the internal combustion engine 2. A fast release of the brake pedal by the driver can thus be interpreted as a driver's desire to start driving immediately after releasing the vehicle brake.

In addition, or as an alternative to this, the transmission capacity can be adjusted in the previously described process depending on a driving program selected by the driver and varied, if required, depending on the operating state and/or can also be adjusted depending on a driver type determined via an adaptive driver type evaluation to be able to provide the desired spontaneity of the vehicle.

In addition, the transmission capacity of a further shiftable element 14 of the power train 1, according to FIG. 1, arranged between the starting device 6 and the output 5 and provided with a continuously variable transmission capacity, can be correspondingly varied, via the previously described process, to adjust a desired spontaneity of a vehicle. The transmission capacity of the further shifting element 14 is adjusted to an amount at which a defined torque, that ensures at least approximately the desired spontaneity of the vehicle, can be directed in the direction of the output 5, via the further shifting element 14, when a demand for a startup of the internal combustion engine 2 and when the engine start/stop function is activated, wherein the further shifting element 14 switches into a slip operation when a torque that exceeds the defined torque is applied.

The further shifting element 14 is herein a non-positive shifting element of the transmission mechanism 4 and can be arranged, in a further embodiment of the power train 1, on the side of the transmission input between the starting device 6 and the transmission mechanism 4 or as a separate component of the power train 1, also outside of the housing of the transmission mechanism 4 on the side of the transmission output between the transmission mechanism 4 and the output 5, to provide a gear ratio of the transmission mechanism 4.

The transmission capacity of the further non-positive shifting element 14 can be adjusted or varied in the same way as the transmission capacity of the non-positive shifting element 6A of the starting device 6, depending upon actuation of a brake pedal by the driver and/or a power demand element of the vehicle, further depending upon a driving program, selected by the driver, and a driver type, determined via an adapted driver type evaluation, in order to provide a desired spontaneity of the vehicle by applying a specific torque at the output.

A security and comfort function is assigned to the further shifting element 14, since a torque directed to the output 5, via the further shifting element 14, can be easily limited by way of a corresponding adjustment of the transmission capacity of the further shifting element 14 in this area of the power train 1 and fluctuations of the transmission capacity of the non-positive shifting element 6A of the starting device 6, which are caused, for example, by production tolerances and/or control and/or management deviations, can be compensated for in the area of the further shifting element 14.

Figure 2:
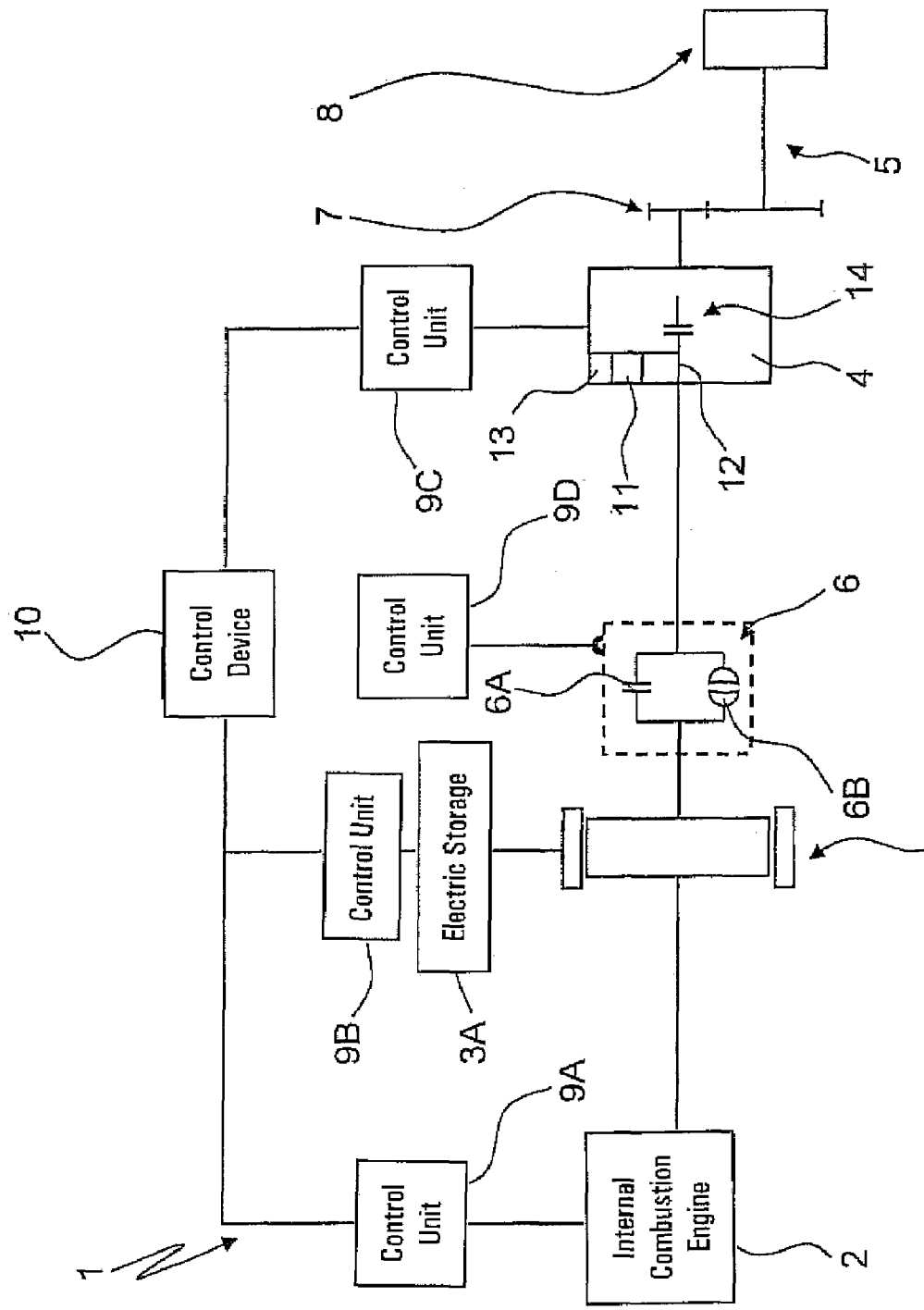
FIG. 2 shows a representation corresponding to that of FIG. 1 of a second embodiment of a power train.

FIG. 2 shows a second exemplary embodiment of a power train 1, which can likewise be operated with the previously described process for adjusting a desired spontaneity of a vehicle. The power train 1, according to FIG. 2, differs herein from the power train 1, represented in FIG. 1, merely in the area of the startup element 6, which aside from the non-positive shifting element 6A is also configured with a hydrodynamic torque converter 6B. This means that the non-positive shifting element 6A of the starting device 6 of the power train 1, according to FIG. 2, is configured as a so-called converter bridging clutch in order to reduce the hydraulic power losses of the hydrodynamic torque converter 6B, provided herein as starting element in a known manner in dependence upon the operating state.

The non-positive shifting element 6A is furthermore operated initially in the same way as the non-positive shifting element 6A of the power train 1, according to FIG. 1, when there is a demand for startup of the internal combustion engine 2 or its transmission capacity is adjusted in such a way that at least part of the portion of the input torque of the starter unit 3 that exceeds the startup input torque of the internal combustion engine 2 is applied at the output 5 to set a desired spontaneity of the vehicle configured with the power train 1, according to FIG. 2.

The similar activation of the non-positive shifting elements 6A of the starting device 6 of the power train 1, according to FIG. 2, provided as converter bridging clutch and of the non-positive shifting element 6A of the power train 1, according to FIG. 1, is based on the fact that with low input rotational speeds of either the internal combustion engine 2 or the starter unit 3, that is, at the start of the startup procedure of the internal combustion engine 2 based on the converter identification, essentially no torque is directed or can be directed, via the hydrodynamic torque converter 6B.

Only with increasing input rotational speeds of either the internal combustion engine 2 or the starter unit 3 or increasing speed difference between the converter pump side and the converter turbine side, increases also the torque that can be directed, via the torque converter 6B, so that the torque value applied at the output 5 is made increasingly available, via the torque converter 6B with increasing input rotational speeds of the internal combustion engine 2. This is a result of the converter identification of the torque converter 6B, since the torque that can be delivered via the torque converter 6B increases quadratically over the input rotational speed of the torque converter 6B.

For this reason, the transmission capacity of the non-positive shifting element 6A of the starting device 6 of the power train 1, according to FIG. 2, varies during the startup procedure of the internal combustion engine 2, depending upon the rotational speed of the internal combustion engine 2, to the effect that the torque required to make available the desired spontaneity of the vehicle is applied at the output 5.

The same applies to the operation of the further shifting element 14 of the transmission mechanism 4, wherewith limiting the amount of torque applied at the output 5 can easily be accomplished in the area of the further shifting element 14 also when the power train 1 is provided with the torque converter 6B. The additional activation of the further shifting element 14 offers the possibility of attenuating or completely eliminating the hydrodynamic influences of the torque converter 6B without complicated control and management electronics in the area of the further shifting element 14, which is possible without problem, for example, by way of the previously described operation of the non-positive shifting element 6A of the starting device 6.

In an embodiment with the torque converter 6B being a two-line converter, the transmission capacity of the non-positive shifting element 6A of the starting device 6 can also be adjusted, not only via a hydraulic activation, but also via a spring mechanism that presses the non-positive shifting elements 6A in the direction in which it is engaged, wherein the transmission capacity of the non-positive shifting element 6A is varied in dependence upon the inner pressure of the hydrodynamic torque converter 6B. This means that the transmission capacity of the non-positive shifting element 6A of the starting device 6 at the start of the startup procedure of the internal combustion engine 2 is set to a predefined value on the side of the spring mechanism and decreases with an increasing flow rate of the hydrodynamic torque converter 6B. With a further increase of the flow rate of the torque converter 6B, increases also the transmission capacity of the non-positive shifting element 6A up to a completely engaged state of the shifting element 6A, so that the hydrodynamic power losses within the range of the torque converter 6B are suppressed.

In the embodiment of the torque converter 6B as a known three-line converter, the transmission capacity of the non-positive shifting element 6A of the starting device 6 is adjusted merely, via a hydraulic actuation against a spring mechanism that actuates the shifting element 6A in the direction in which it is disengaged. However, the three-line converter can also be equipped with an elasticity of the non-positive shifting elements 6A known from the customary two-line converters, which is connected, however, with an increased design complexity.

The previously described process for operating a power train, according to FIG. 1 or FIG. 2, represents a simple and cost effective mode of operation, in comparison with the conventionally operated power trains, to shorten the time period starting at the start of the startup procedure of an internal combustion engine by way of the starting device at which the rotational speed of the internal combustion engine starts to increase, up to the time point at which the torque decreases at the output.

In addition, a creeping torque, in which the converter bridging clutch or the non-positive shifting element of the starting device is supplied with a defined transmission capacity, is realized during the startup procedure of an internal combustion engine with the previously described process in a power train with a hydrodynamic torque converter, wherein the transmission capacity alone can be adjusted by way of a corresponding hydraulic activation, a purely mechanical activation with the application of a compression force on the friction elements of the non-positive shifting element of the starting device, or by way of a combination of a mechanical and a hydraulic actuation.

A defined torque is generally introduced into the power train during the startup procedure of an internal combustion engine with the presented process according to the invention, with which backlashes and elasticities in the power train are already overcome at the point in time before a converter identification of a hydrodynamic torque converter has any effect due to the increasing rotational speeds of the internal combustion engine, or the backlashes and elasticities in the power train have been overcome by way of an activation of the starting device with reduced comfort that follows after the activation of the starting device according to the invention. This means that a quasi-harmonization of traction buildup during the startup procedure of the internal combustion engine 2 takes place especially when a hydrodynamic torque converter is present.

A torque that can be made provided at the output is limited by way of the previously described actuation of the further shifting element. If the predefined torque value is exceeded, the further shifting element shifts into a desired slip state. In this way it is easily ensured that rotational speed overshoots, which occur at engine rotational speeds higher than the desired idle rotational speed of the internal combustion engine, due to the increasing influence of the converter identification during the startup procedure, are prevented and a torque jerk of the internal combustion engine is not introduced into the power train 1. After the rotational speed overshoots during the startup of an internal combustion engine have subsided, the further shifting element is completely engaged or the transmission capacity of the further shifting element is increased to a value at which the power flow within the area of the further shifting element is again completely restored.

REFERENCE NUMERALS

1 power train
2 internal combustion engine
3 starter unit
3A electric storage
4 transmission mechanism
5 output
6 starting device
6A non-positive shifting element
6B hydrodynamic torque converter
7 axle differential
8 wheels
9A control unit
9B control unit
9C control unit
9D control unit
10 control device
11 main transmission pump
12 transmission shaft
13 electric motor
14 further shifting element

The invention claimed is:

1. A method of operating a power train (1) of a motor vehicle to transmit torque to an output (5) of the power train (1) during a start/stop operation of an internal combustion engine (2), the power train (1) comprising the internal combustion engine (2), a starter unit (3), a starting device (6) with a frictional shifting element (6A), and the output (5), the starting device (6) being located between the internal combustion engine (2) and the output (5) and the frictional shifting element (6A) having a continuously variable transmitting capacity, the method comprising the steps of:
generating an input torque with the starter unit (3);
starting the internal combustion engine (2) with an amount of the input torque generated by the starter unit (3); and
adjusting the transmission capacity of the frictional shifting element (6A), generally concurrently with the starting of the combustion engine (2), to direct a portion of the input torque generated by the starter unit (3), which is in excess of the amount of the input torque required for starting the internal combustion engine (2), toward the output (5).

2. The method according to claim 1, further comprising the step of determining a maximum input torque that can be generated by the starter unit (3) and determining the amount of the torque required for starting the internal combustion engine (2), based on operating state parameters of the power train (1), a difference of the determined maximum input torque that can be generated by the starter unit (3) and the amount of the input torque required for starting the internal combustion engine (2) corresponds to a maximum amount of the portion of input torque that is directed, via the frictional shifting element (6A) of the starting device (6), toward the output (5).

3. The method according to claim 1, further comprising the step of determining the portion of the input torque of the starter unit (3), which is in excess of the amount of the input torque required for starting the internal combustion engine (2), based on gradients of a characteristic of a rotational speed of the internal combustion engine (2).

4. The method according to claim 1, further comprising the step of utilizing an electric machine with an electric storage (3A) as the starter unit (3) and adjusting the transmission capacity of the frictional shifting element (6A) of the starting device (6) depending on a charge of the electric storage (3A).

5. The method according to claim 1, further comprising the step of varying the transmission capacity of the frictional shifting element (6A) of the starting device (6) depending on actuation of at least one of a brake pedal and a power demand element, via which a driver of the vehicle issues a demand for power.

6. The method according to claim 1, further comprising the step of adjusting the transmission capacity of the frictional shifting element (6A) of the starting device (6) depending on a driving program that is selected by a driver and adjusting the transmission capacity of the frictional shifting element (6A) of the starting device (6) depending upon an operating state.

7. The method according to claim 1, further comprising the step of determining a driver type by an adaptive driver type evaluation and adjusting the transmission capacity of the frictional shifting element (6A) of the starting device (6) depending upon the determined driver type.

8. The method according to claim 1, further comprising the step of arranging the frictional shifting element (6A) of the starting device (6) between the internal combustion engine (2) and a transmission mechanism (4), and utilizing a frictional clutch as the frictional shifting element (6A).

9. The method according to claim 1, further comprising the step of arranging the frictional shifting element (6A) of the starting device (6) between the internal combustion origins (2) and the output (5), and utilizing as the shifting element (6A), a transmission shifting element which manages a transmission gear ratio.

10. The method according to claim 1, further comprising the step of providing the starting device (6) with a hydrodynamic torque converter (6B) and utilizing a converter bridging clutch as the frictional shifting element (6A) of the starting device (6).

11. The method according to claim 10, further comprising the step of utilizing a two-line converter as the hydrodynamic torque converter (6B) and adjusting the transmission capacity of the frictional shifting element (6A) of the starting device (6) by at least one of a hydraulic activation and force of a spring mechanism, that biases the frictional shifting element (6A) into engagement.

12. The method according to claim 11, further comprising the step of adjusting the transmission capacity of the frictional shifting element (6A) depending on an inner pressure of the hydrodynamic torque converter (6B).

13. The method according to claim 10, further comprising the step of utilizing a three-line converter as the hydrodynamic torque converter (6B) and adjusting the transmission capacity of the frictional shifting element (6A) of the starting device (6) by hydraulically activating the hydrodynamic torque converter (6B).

14. The method according to claim 10, further comprising the step of adjusting the transmission capacity of the frictional shifting element (6A) of the starting device (6) depending upon a rotational speed of the internal combustion engine (2).

15. The method according to claim 1, further comprising the step of arranging a further shifting element (14), which has a continuously variable transmission capacity, between the starting device (6) and the output (5), and setting a transmission capacity of the further shifting element (14) to a value at which a defined torque is directed toward the output (5), via the further shifting element (14), when a demand is made for starting the internal combustion engine (2) and the engine start/stop function is activated, and reducing the transmission capacity of the further shifting element (14), when a torque directed toward the output (5) exceeds the defined torque.

16. The method according to claim 15, further comprising the step of adjusting the transmission capacity of the further shifting element (14) depending on actuation of at least one of a brake pedal and a power demand element, via which a driver of the vehicle issues a demand for power.

17. The method according to claim 15, further comprising the step of adjusting the transmission capacity of the further shifting element (14) depending on a driver selected driving program and adjusting the transmission capacity of the further shifting element (14) depending on an operating state of the vehicle.

18. The method according to claim 15, further comprising the step of determining a driver type by an adaptive driver type evaluation and adjusting the transmission capacity of the further shifting element (14) depending upon the determined driver type.

19. The method according to claim 15, further comprising the step of adjusting the transmission capacity of the further shifting element (14) depending on a rotational speed of the internal combustion engine (2).

20. A method of operating a motor vehicle power train (1) during activation of an internal combustion engine start/stop procedure, the power train (1) comprising a starter unit (3), a starting device (6), which comprises a frictional shifting element (6A) that transmits a variable amount of torque, and a drive output (5), the starting device (6) being arranged between the internal combustion engine (2) and the drive output (5), the method comprising the steps of:

generating with the starter unit (3) at least an amount of torque required for starting the internal combustion engine (2);

transmitting a portion of torque from at least one of the internal combustion engine (2) and the input torque of the starter unit (3), via the starting device (6), to the drive output;

defining the portion of torque transmitted from the at least one of the internal combustion engine (2) and the input torque of the starter unit (3) depending on a current torque transmission capacity setting of the frictional shifting element (6A); and adjusting the current torque transmission capacity setting of the frictional shifting element (6A) to a value at which at least an amount of a portion of torque from the starter unit (3), in excess of the amount of torque required to start the internal combustion engine (2), is transmitted toward the output (5) during the internal combustion engine start/stop procedure.

* * * * *